United States Patent
Masciantonio

(10) Patent No.: US 7,187,284 B2
(45) Date of Patent: Mar. 6, 2007

(54) ACTIVE ANTI-THEFT DEVICE FOR SECURING PROPERTY

(76) Inventor: Martin Masciantonio, 20 Newbury Way, Lansdale, PA (US) 19446-4378

(*) Notice: Subject to any disclaimer, the term of this patent is extended or adjusted under 35 U.S.C. 154(b) by 176 days.

(21) Appl. No.: 11/090,167

(22) Filed: Mar. 28, 2005

(65) Prior Publication Data

US 2006/0214790 A1    Sep. 28, 2006

(51) Int. Cl.
- B60Q 1/00 (2006.01)
- G08B 13/12 (2006.01)
- G08B 13/14 (2006.01)
- G08B 21/00 (2006.01)
- E05B 69/00 (2006.01)
- E05B 73/00 (2006.01)

(52) U.S. Cl. ............... 340/568.2; 340/425.5; 340/426.1; 340/427; 340/568.1; 340/686.2; 70/30; 70/57; 70/58; 70/59; 70/60; 70/61

(58) Field of Classification Search ............. 340/425.5, 340/426.1, 427, 568.1, 568.2, 686.2; 70/30, 70/57, 58–64
See application file for complete search history.

(56) References Cited

U.S. PATENT DOCUMENTS

| | | | |
|---|---|---|---|
| 3,910,081 A * | 10/1975 | Pender | 70/234 |
| 4,028,916 A * | 6/1977 | Pender | 70/233 |
| 5,408,212 A * | 4/1995 | Meyers et al. | 340/427 |
| 5,408,213 A * | 4/1995 | Ungarsohn | 340/427 |
| 5,579,657 A * | 12/1996 | Makous | 70/15 |
| 5,754,108 A * | 5/1998 | Ungarsohn | 340/568.1 |
| 5,889,463 A * | 3/1999 | Judd et al. | 340/427 |
| 6,040,763 A * | 3/2000 | Nakajima | 340/427 |
| 6,191,685 B1 * | 2/2001 | Theofanous et al. | 340/432 |
| 6,297,963 B1 * | 10/2001 | Fogle | 361/747 |
| 6,621,415 B1 * | 9/2003 | Willis | 340/568.2 |

* cited by examiner

*Primary Examiner*—Daniel Wu
*Assistant Examiner*—Lam Pham
(74) *Attorney, Agent, or Firm*—Breiner & Breiner, L.L.C.

(57) ABSTRACT

An active anti-theft device for protecting movable property having a computer device, at least one stationary connector, at least one portable connector, at least one sensor, a power source and an alarm is described. The active anti-theft device may also have a key switch, remote control and light. The computer device is the central unit which sends a signal to the other components of the active anti-theft device. The stationary connector attaches to a stationary object. The portable connector(s) and sensor(s) attach to various parts of the movable property. The connectors and sensors connect to the computer device by cable connections, which enable the connector(s) and sensor(s) to be connected to and thereby protect various components of the movable property. If a signal sent by the computer device to a connector or sensor does not return to the computer device as predetermined by a monitoring setup, the alarm sounds indicating that a connection to a component has been broken or disabled.

20 Claims, 4 Drawing Sheets

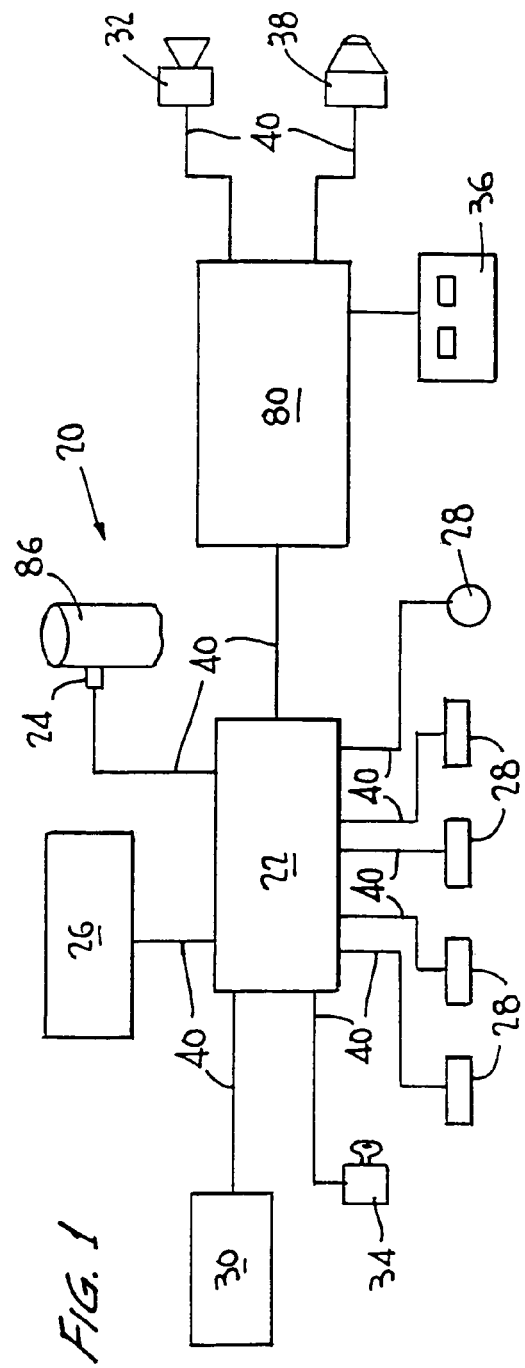
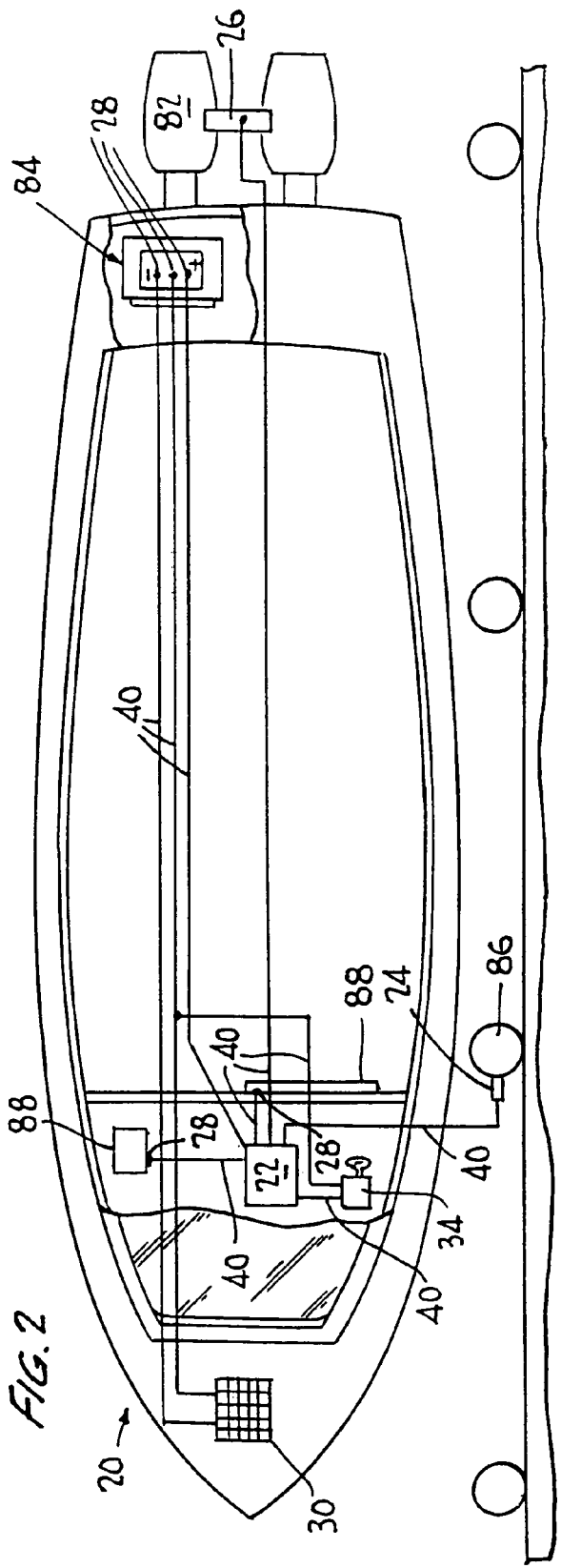
FIG. 1
FIG. 2

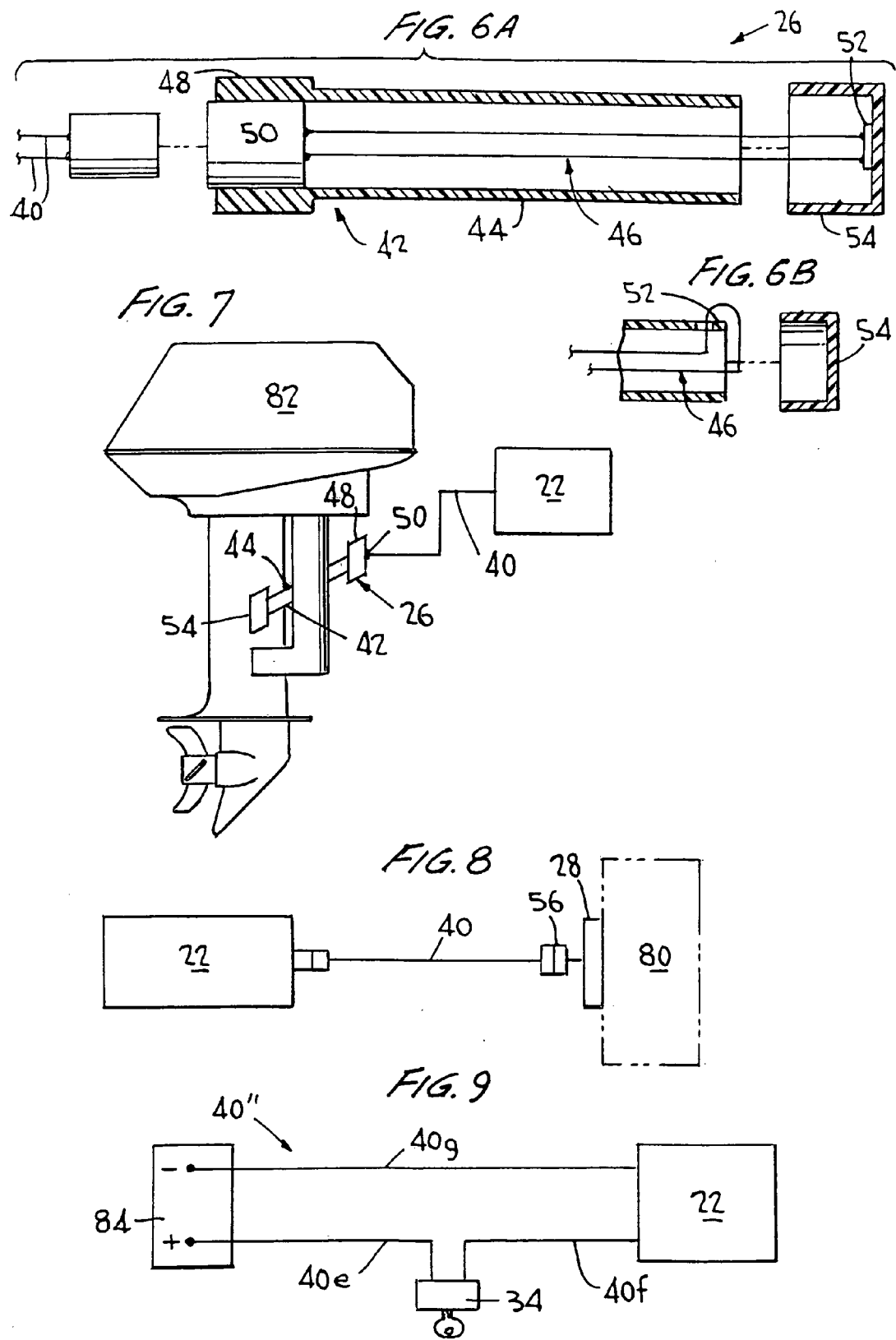

ACTIVE ANTI-THEFT DEVICE FOR SECURING PROPERTY

FIELD OF INVENTION

The present invention relates to an active anti-theft device for any single or multiple movable property items such as boats, cars, planes, trailers, heavy equipment, other vehicles, and the like. More particularly, the active anti-theft device protects movable property so that the movable property cannot be stolen. In the case of motorized property, the property cannot be moved without removal of the anti-theft device. The anti-theft device is an active alarm system which attaches to the battery of the property or a stationary structure containing or attached to a suitable power source.

BACKGROUND OF INVENTION

Theft of property, especially under the cover of night, is a problem that owners face because of the lack of noise and light. A thief can steal the property away without anyone noticing. Theft of property is a problem that property owners potentially face, especially owners of expensive or luxury items. Accordingly, a property owner often purchases an alarm system for protecting the property, but many of these systems are passive. In a passive system, a thief can simply roll, float or carry away the property under the cover of night or when the owner is away. Additionally, most alarm systems are designed specifically for automobiles and not for other property or vehicles such as boats, campers, motor homes, planes, trailers, heavy equipment or the like. Additionally, a thief often learns how to get around and disarm an alarm system and steals the property anyway. As such, alarm systems are continually being designed to try to deter a thief and/or prevent the theft of the property.

While many alarm systems exist, most are directed for use with only automobiles. As such, a need exists for an anti-theft device that can be used for various property items including, but not limited to, boats, automobiles, campers, small planes, trailers, heavy machinery or equipment or the like. While alarm systems are applicable to a diverse and wide range of property items and can protect them, the securing of a boat is one illustrative example for using an alarm system.

Most existing alarm systems do not prevent the theft of a boat while the boat motor is off. Many of the known alarm systems only protect the boat from having the motor started and the boat driven away. While this is beneficial, an alarm system also needs to protect the boat when the motor is not started. For example, an alarm may protect a boat from being started, but does not protect the boat from being untied from the dock and floated away to a remote location where the thief can start the engine or tow the boat to a safe location in order to have a new key made, sell the boat or parts thereof or the like.

Accordingly, the need exists for an active anti-theft device to protect property, such as a boat, from theft by preventing the motor from being started and protect the property from being stolen without the thief starting the property and moving, e.g., rolling, towing or floating, the property to a remote location before starting the motor.

OBJECTS AND SUMMARY OF INVENTION

The present invention relates to an active anti-theft device for movable property which is self-propelled such as boats, automobiles, motorcycles, motor homes, small planes, heavy machinery or equipment, e.g., bulldozer or backhoe, or movable property which is non-self-propelled such as trailers and campers, or the like. More particularly, the active anti-theft device protects movable property so that the property cannot be stolen even when the motor of the movable property has not been started. The active anti-theft device is an active alarm system which may attach to the battery of the property and receives power therefrom while having a power source such as a solar panel or a standard outlet providing power to the battery.

The active anti-theft device of the present invention comprises a computer device, at least one stationary connector, at least one portable connector, at least one sensor, a power source and a siren or alarm means. The active anti-theft device may also comprise a key switch, a remote control and a light such as a strobe light.

The computer device is the central unit of the active anti-theft device which sends a signal to the other components of the active anti-theft device. The at least one stationary connector preferably attaches to a stationary object such as a building or dock. The at least one portable connector and the at least one sensor attach to or through various predetermined parts of the property such as, but not limited to, the motor, the doors, the battery and the like. The connectors and sensors preferably connect to the computer device by connections. This enables the components of the active anti-theft device to cover, surround and thereby protect the property by connecting to various components of the property.

If a signal sent by the computer device to a connector, sensor or any other component does not return to the computer device as predetermined by a monitoring setup, the alarm sounds to indicate that a connection to at least one of the connectors, sensors or components has been broken, tampered with, or disabled.

While the active anti-theft device may be used to protect movable property, for ease of discussion, the property will be described hereinafter in terms of a vehicle such as a boat. However, the active anti-theft device may protect any suitable movable property in a like manner.

A primary object of the present invention is to provide an active anti-theft device to protect a vehicle, such as a boat, by connecting to various components of the vehicle, thereby providing various contact points to protect the vehicle from theft.

A primary object of the present invention is to provide an active anti-theft device which comprises a computer device, at least one stationary connector, at least one portable connector, at least one sensor, a power source and a siren or alarm means for protecting a vehicle by attaching to various components of the vehicle.

A primary object of the present invention is to provide an active anti-theft device which may be used to protect various types of property including, but not limited to, boats, automobiles, motorcycles, campers, motor homes, small planes, trailers, heavy machinery or equipment, or the like.

A primary object of the present invention is to provide an active anti-theft device which protects movable property, such as a boat, from being stolen even without starting the vehicle.

A primary object of the present invention is to provide an active anti-theft device which is an active alarm system which attaches to the battery of the vehicle and receives power from a power source.

Further objects, features and benefits of the present invention will be readily apparent to those skilled in the art based upon this disclosure.

BRIEF DESCRIPTION OF THE DRAWINGS

Referring now to the drawings:

FIG. 1 shows a preferred embodiment of an active anti-theft device of the present invention;

FIG. 2 shows the active anti-theft device of FIG. 1 in an environment of use, e.g., with a boat;

FIG. 6A shows an embodiment of a partial cross-sectional exploded view of the portable connector of FIG. 5A;

FIG. 6B shows a partial embodiment of a partial cross-sectional exploded view of the portable connector;

FIG. 7 shows the portable connector of FIG. 5A in an environment of use, e.g., connected to a motor;

FIG. 8 shows a preferred embodiment of a sensor of FIG. 1 in an environment of use, e.g., attached to an object of a vehicle;

FIG. 9 shows a preferred embodiment of a key switch of FIG. 1 connecting to a computer device and a battery of a vehicle;

DETAILED DESCRIPTION OF THE PREFERRED EMBODIMENTS

Figure 3:
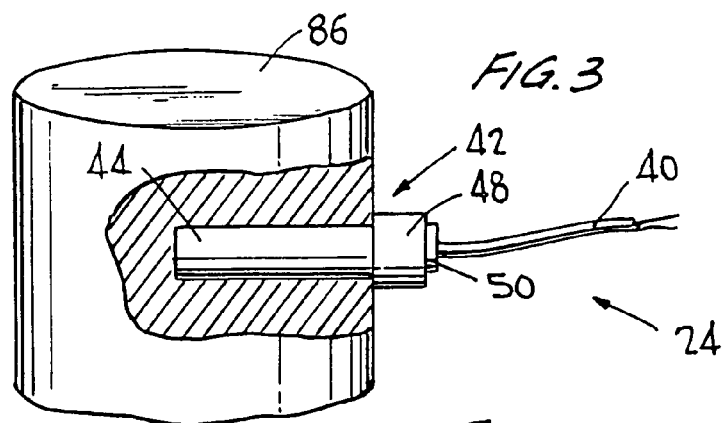
FIG. 3 shows a preferred embodiment of a stationary connector of FIG. 1 in an environment of use, e.g., secured to a dock post.
Figure 4:
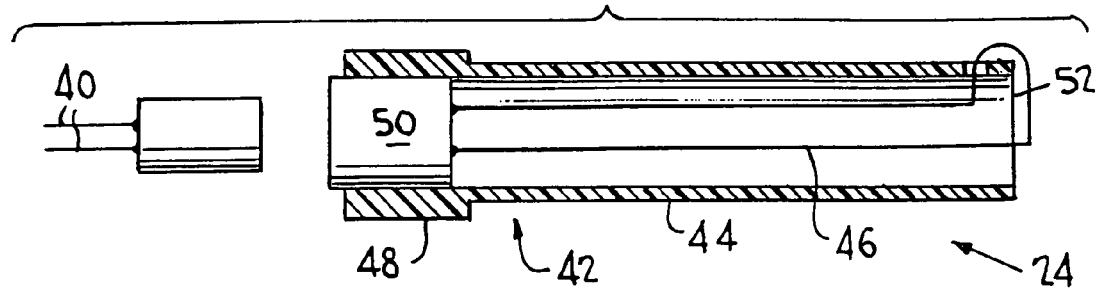
FIG. 4 shows a partial cross-sectional view of the stationary connector of FIG. 3.
Figure 5A:
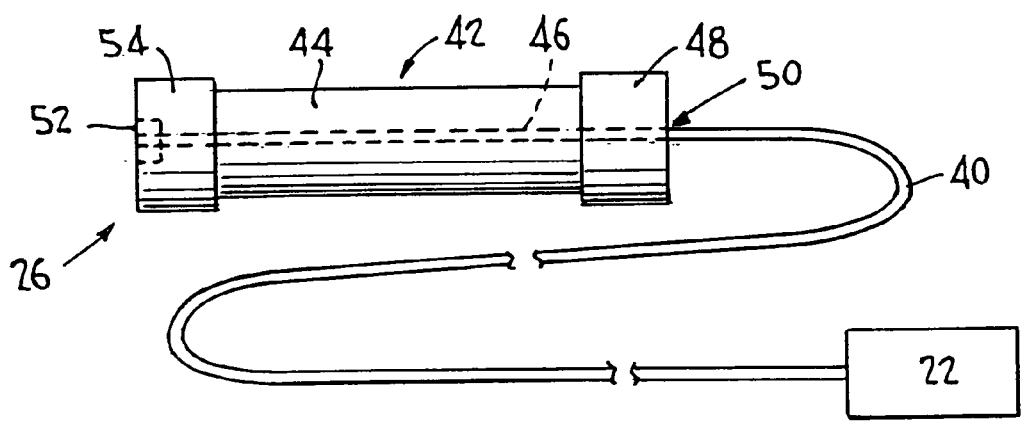
FIGS. 5A and 5B show a preferred embodiment of a portable connector of FIG. 1.
Figure 5B:
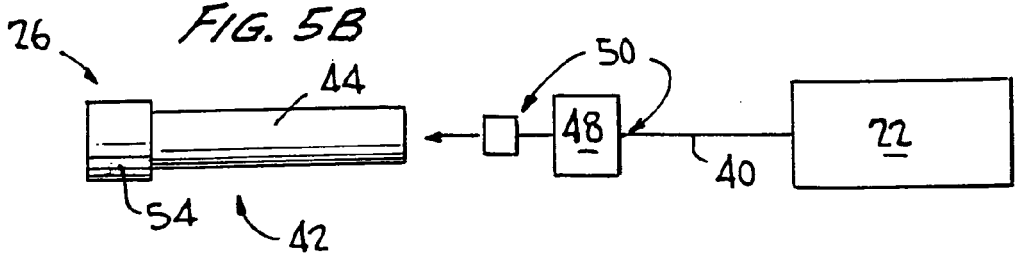

The present invention is an active anti-theft device 20 for movable property such as boats, automobiles, motorcycles, campers, motor homes, small planes, trailers, bicycles, heavy machinery or equipment, e.g., bulldozer or backhoe, or the like. While the active anti-theft device 20 may be used to protect any suitable movable property, the property will be described hereinafter in terms of a vehicle, such as a boat, for ease of discussion and is not intended to limit the invention. More particularly, the active anti-theft device 20 attaches to various components of the vehicle 80, for example a boat, and protects the vehicle so that the vehicle cannot be stolen even when the motor 82 of the vehicle 80 is not started. The active anti-theft device 20 is an active alarm system which attaches to the battery 84 of the vehicle 80 and receives power therefrom while having a power source 30 such as a solar panel or a standard outlet providing power to the battery. In an alternate embodiment such as where the vehicle does not have a battery, such as a trailer or bicycle, the active anti-theft device 20 receives power directly from the power source 30.

As shown in FIGS. 1–10C, the active anti-theft device 20 of the present invention comprises a computer device 22, at least one stationary connector 24, at least one portable connector 26, at least one sensor 28, a power source 30 and an alarm means such as a siren 32. The active anti-theft device 20 may also comprise a key switch 34, a remote control 36 and a light 38 such as a strobe light.

The computer device 22 is the central unit of the active anti-theft device 20. The computer device 22 connects to the at least one stationary connector 24, the at least one portable connector 26, the at least one sensor 28, the power source 30 and the siren 32 by means of connections, such as cables 40. While the connections are described in terms of cables 40, any suitable connections may be used. The computer device 22 also connects to the key switch 34 and the light 38 by means of cables 40. The computer device 22 sends a signal to each connector 24, 26 and sensor 28, to the siren 32 and to the power source 30. The computer device 22 also sends a signal to the key switch 34 and the light 38. The computer device 22 then monitors the signal for the signal to return to the computer device 22. If the signal does not return to the computer device 22 as predetermined by the monitoring setup, the alarm will sound, i.e., setting off the siren 32 and/or the light 38, indicating that the connection to one of the connectors 24, 26, sensors 28 or other components has been broken or disturbed.

The computer device 22 has suitable software and programming for sending a signal to the various components, monitoring the various connections and providing for a predetermined response in the event any one connection fails. The predetermined response can be any one or combination of activation of a light, siren, forwarding a signal to an outside monitoring device, e.g., security panel at a watch center or police station.

The computer device 22 may be operatively affixed to the vehicle 80 in any suitable location, preferably in a location that is out of sight of a person viewing the vehicle. Alternatively, the computer device 22 may be placed in a remote location, such as a building, such that the connections between the computer device 22 and the other components may be cables, wireless connections or other connections that protect the vehicle from theft.

The cables 40 which connect the computer device 22 to the other components of the anti-theft device 20 are of a suitable length so that the connectors 24, 26 and sensors 28 may extend from the computer device 22 to the particular component of the vehicle 80 to which it attaches. This enables the components of the anti-theft device 20 to cover, surround and thereby protect the vehicle by connecting to various components of the vehicle.

As shown for example in FIGS. 3, 4, 5A, 5B, 6A and 6B, the at least one stationary connector 24 and the at least one portable connector 26 comprise a housing 42 having a body 44, a first end and a second end and at least one wire 46 or cable inside of the housing 42. The housing 42 is preferably cylindrical and has a first end cap 48 having a cable attachment member 50. The first end cap 48 is operatively positioned on the first end of the housing 42. The wire 46 inside of the housing 42 attaches to an inner side of the cable attachment member 50 and extends through the body 44 of the housing 42 to the back, i.e., second end, of the housing 42. The wire 46 then affixes to and is held in place by a catch member 52. The wire 46 then loops around the catch member 52 and attaches again to the inner side of the cable attachment member 50. The catch member 52 ensures that if a person tries to detach the wire 46 from the cable attachment member 50 or cut the wire 46 inside of the housing 42, the signal sent by the computer device 22 to the stationary connector 24 or the portable connector 26 is broken and does not return to the computer device 22, thereby causing an alarm to sound, i.e., setting off the siren 32 and/or the light 38. In the stationary connector 24, the catch member 52 is operatively positioned on the housing 42, as shown for example in FIG. 4. In the portable connector 26, the catch member 52 is preferably operatively positioned on a second end cap 54 as shown for example in FIG. 6A and described further hereinafter. In an alternate embodiment of the portable connector 26, the catch member 52 may be operatively positioned on the housing 42, such as shown for example in FIG. 6B and as positioned in the stationary connector 24.

The wire 46 may be held in place in the body 44 near the cable attachment member 50 by a suitable brace means to prevent the wire 46 from moving freely in the body 44 when the wire 46 is detached from the cable attachment member 50. The wire 46 may have any suitable connection head to attach to the inner side of the cable attachment member 50.

The portable connector 26 preferably has a second end cap 54 which affixes to the second end of the housing 42, as shown for example in FIGS. 5A, 5B, 6A and 6B. In a preferred embodiment of the portable connector 26, the catch member 52 is operatively positioned on the inside of the second end cap 54, as shown for example in FIG. 6A and as described above.

In a preferred embodiment, the cable attachment member 50 of the stationary connector 24 and the portable connector 26 is a telephone jack receiver member and the wire 46 inside of the housing 42 is a telephone wire.

The stationary connector 24 preferably attaches to a stationary object 86, such as a building or a dock post. As shown for example in FIG. 3, the stationary connector 24 is inserted into the stationary object 86 and embedded up to the first end cap 48. Accordingly, the stationary connector 24 cannot be removed from the stationary object 86 and a person cannot disconnect the wire 46 inside of the housing 42 without disturbing the signal thereto such that the signal does not return to the computer device 22. Additionally, a person cannot remove the cable 40 from the cable attachment member 50 without breaking the signal to the computer device 22 when the active anti-theft device 20 is armed.

The at least one portable connector 26 may be secured to various components of a vehicle 80. The portable connector 26 may preferably be inserted between parts of a component on the vehicle such that the portable connector 26 cannot be removed from the component after the alarm system is activated without disturbing the signal from the computer and sounding the alarm. The portable connector 26 may be secured through any suitable component of the vehicle as described, for example, as follows. As shown for example in FIG. 7, the portable connector 26 may be operatively secured to the motor 82 of the vehicle. Preferably, the first end cap 48 of the portable connector is removed from the first end of the housing 42, and the body 44 of the housing 42 of the portable connector 26 is inserted through the components of the motor 82 since the body 44 has a smaller diameter than the end caps 48, 54. The body 44 is inserted between the components of the motor such that the second end cap 54 cannot pass through the components. The first end cap 48 having the cable attachment member 50 then connects to the wire 46 inside of the housing 42 and affixes to the first end of the housing 42 of the portable connector 26. The portable connector 26 is then secured within the components of the motor since the end caps 48, 54 cannot pass through the components of the motor. A first end of the cable 40 may then be connected to the cable attachment member 50 on the portable connector 26 and a second end of the cable 40 may then be connected to the computer device 22.

Once inserted through the motor and the alarm is armed, the signal from the computer device 22 loops through the cable 40 to the cable attachment member 50, through the wire 46, back through the cable attachment member 50 and the cable 40 to the computer device 22. The signal to the portable connector 26 cannot be disturbed without sounding the alarm since the portable connector 26 cannot be removed from the motor without removing the first end cap 48, disconnecting the wire 46 from the inside of the cable attachment member 50 and removing the body 44 of the portable connector 26 from the components of the motor.

If a person tries to detach or cut the wire 46 inside of the housing 42 or the cable 40 from the cable attachment member 50, the signal sent by the computer device 22 to the portable connector 26 is broken and does not return to the computer device 22, wherein an alarm will sound. The portable connector 26 provides protection to a vehicle from having the motor or any other part or piece of equipment which has a portable connector 26 passed through it from being removed.

The portable connector 26 may be secured to any other suitable vehicle component as described above.

The at least one sensor 28 may be attached to any suitable part of the vehicle such as, but not limited to, the doors 88, e.g., cabin doors or battery cabinet doors, a bilge pump of a boat, a motor and the like. The sensors 28 may be any suitable sensor device. As shown in FIG. 8, for example, each sensor 28 has a suitable attachment member 56 on one face and attaches to the vehicle component by a second face. A cable 40 then connects the attachment member 56 of the sensor 28 to the computer device 22. The attachment member 56 may be any suitable attachment member for receiving the cable 40.

Figure 10A:
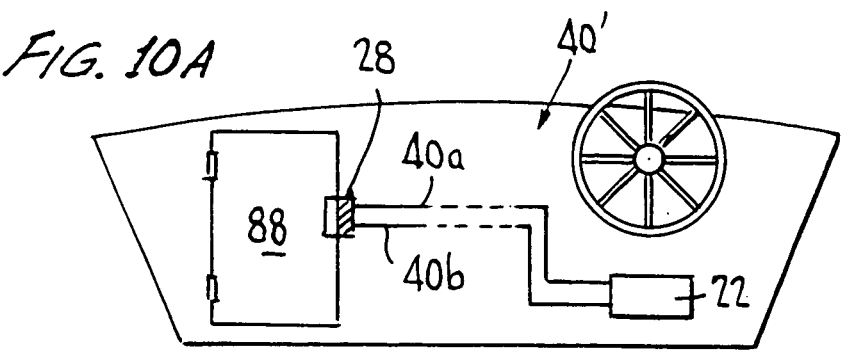
FIG. 10A shows a preferred embodiment of a sensor of FIG. 1 in an environment of use, e.g., attached to a door of a vehicle.

The sensors 28 may be connected to the doors 88 of a vehicle in any suitable manner. However, a preferred embodiment of the sensors 28 connecting to the doors 88 of a vehicle, such as cabin doors of a boat, is shown for example in FIGS. 10A–10C. As shown in FIG. 10A, for example, a sensor 28 may connect to one door, e.g., a cabin door of a boat, by operatively placing a sensor 28 on the door and connecting the sensor 28 to the computer device 22 by a cable connection 40'. The cable connection 40' includes a series of door wires. Specifically, a first end of a first door wire 40a or cable connects to the computer device 22 and a second end of the first door wire 40a connects to the sensor 28 on the door. A first end of a second door wire 40b or cable connects to the computer device 22 and a second end of the second door wire 40b connects to the sensor 28 on the door. The wire connection creates a loop for a signal from the computer device 22 to be sent to the sensor 28 and then return to the computer device 22. If the signal through the door wires does not return to the computer device 22 as predetermined by the monitoring setup, such as if the door wires are detached or cut, the alarm will sound.

Figure 10B:
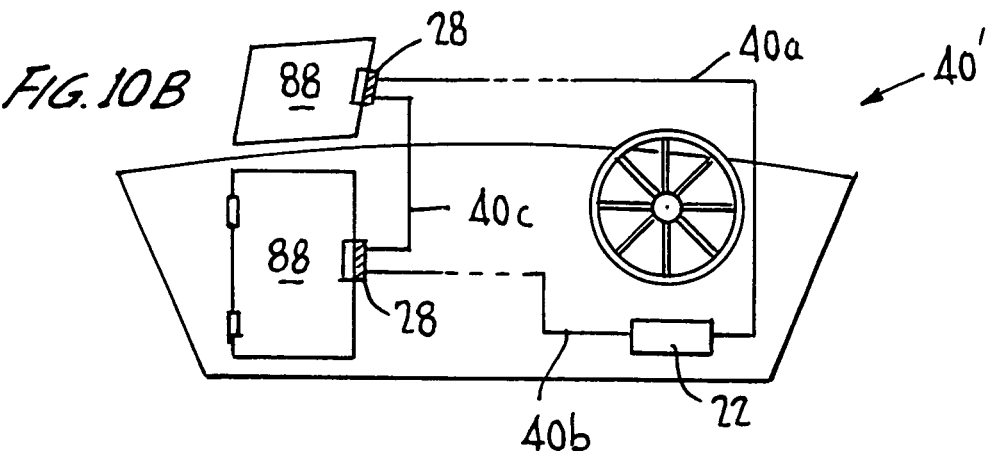
FIG. 10B shows a preferred embodiment of sensors of FIG. 1 in an environment of use, e.g., attached to two doors of a vehicle.

A preferred embodiment of sensors 28 placed on two doors of a vehicle is shown for example in FIG. 10B. A sensor 28 is placed on each door 88. Then, a first end of a first door wire 40a or cable connects to the computer device 22 and a second end of the first door wire 40a connects to the sensor 28 on the first door. A first end of a second door wire 40b or cable connects to the computer device 22 and a second end of the second door wire 40b connects to the sensor 28 on the second door. A first end of a third door wire 40c or cable connects to the sensor 28 on the first door and a second end of the third wire 40c connects to the sensor 28 on the second door. The series of wires and sensors 28 creates a loop for a signal from the computer device 22 to go through the first door wire 40a to the sensor 28 on the first door, through the third door wire 40c to the sensor 28 on the second door, through the second door wire 40b and then return to the computer device 22. If the signal through the door wires and sensors does not return to the computer device 22 as predetermined by the monitoring setup, such as if the door wires are detached or cut, the alarm will sound.

Figure 10C:
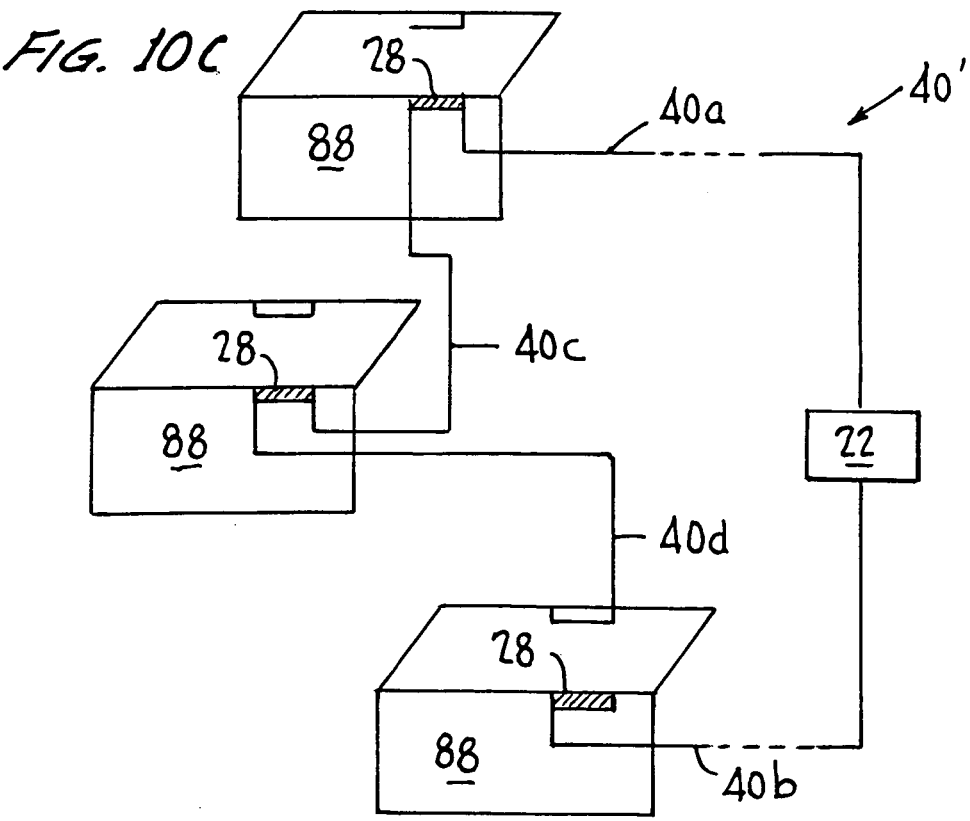
FIG. 10C shows a preferred embodiment of sensors of FIG. 1 in an environment of use, e.g., attached to three doors of a vehicle.

A preferred embodiment of sensors 28 placed on three doors of a vehicle is shown for example in FIG. 10C. A sensor 28 is placed on each of the three doors 88. Then, a first end of a first door wire 40a or cable connects to the computer device 22 and a second end of the first door wire 40a connects to the sensor 28 on the first door. A first end of a second door wire 40b or cable connects to the computer device 22 and a second end of the second door wire 40b connects to the sensor 28 on the third door. A first end of a third door wire 40c or cable connects to the sensor 28 on the first door and a second end of the third door wire 40c connects to the sensor 28 on the second door. A first end of a fourth door wire 40d or cable connects to the sensor 28 on the second door and a second end of the fourth door wire 40d connects to the sensor 28 on the third door. The series of wires and sensors creates a loop for a signal from the computer device 22 to go through the first door wire 40a to the sensor 28 on the first door, through the third door wire 40c to the sensor 28 on the second door, through the fourth door wire 40d to the sensor 28 on the third door, through the second door wire 40b and then return to the computer device 22. If the signal through the door wires and sensors does not return to the computer device 22 as predetermined by the monitoring setup, such as if the door wires are detached or cut, the alarm will sound.

The key switch 34 of the anti-theft device activates and deactivates the anti-theft device. The key switch 34 may optionally be operated by a remote control 36. The key switch 34 may be any suitable control device which activates and deactivates the active anti-theft device 20. In a preferred embodiment and as shown for example in FIG. 9, the key switch 34 preferably connects to the computer device 22 through a cable connection 40". The cable connection 40" includes a series of key switch wires. Specifically, a first end of the first key switch wire 40e connects to the battery 84 of the vehicle and a second end of the first key switch wire 40e connects to the key switch 34. A first end of a second key switch wire 40f connects to the key switch 34 and a second end of the second key switch wire 40f connects to the computer device 22. A first end of a third wire 40g connects to the computer device 22 and a second end of the third wire 40g connects to the battery 84 of the vehicle.

If the signal through the key switch wires does not return to the computer device 22 as predetermined by the monitoring setup, such as if the key switch wires are detached, cut or disturbed, the alarm will sound.

While cables and wires form various connections between the components of the invention in the preferred embodiments described above, any suitable cable, wire, circuitry, or connection means may be used to connect the components of the invention.

The active anti-theft device 20 is an active alarm system, i.e., always running, which receives power from the battery 84 of the vehicle. However, in order to prevent too much power from being drained from the battery 84, the anti-theft device 20 has a power source 30. The power source 30 can be any suitable power source. In a preferred embodiment and as shown for example in FIG. 2, the power source 30 can be a solar panel device which uses solar power to charge the battery of the vehicle. A solar panel device is especially useful when a vehicle is not located near an electrical outlet, such as a boat tied to a dock. In another preferred embodiment, the power source 30 is an electrical plug which plugs into an electrical outlet and draws power therefrom to charge the battery of the vehicle. In an embodiment where the vehicle does not have a battery, such as a trailer or a bicycle, the active anti-theft device 20 receives power directly from the power source 30, such as a separate battery or an electrical plug.

A signal is sent from the computer device 22 to the power source 30. If the signal does not return to the computer device 22 as predetermined by the monitoring setup, the alarm will sound. This prevents the power source 30 from being disconnected from the active anti-theft device 20 without the alarm sounding. If the computer device 22 is located in a remote location, and connected to the power source 30, the property being protected can be connected to the computer device 22 by various remote sensors.

While the connections between the computer device 22 and the other components of the active anti-theft device 20 have been described in terms of being cables or wire connections, these connections may be suitable remote or wireless connections.

The active anti-theft device 20 is especially beneficial in preventing the tow-away or the float-away of a boat or other movable property.

The active anti-theft device 20 of the present invention may be used alone as described above or in conjunction with a Global Positioning System (GPS) which could locate the movable property in the event that it is stolen. The active anti-theft device 20 can be used with any suitable GPS device for remote tracking of movable property. This system could also provide notification to the property owner, local security and/or local police in the event that the alarm sounds.

A further option is to provide links between multiple items of movable property, such as vehicles or equipment, to a common security panel, e.g., for multiple boats in a marina, multiple pieces of equipment such as at a construction site, or the like. Such can provide for an added layer of security.

The components of the active anti-theft device may be made of any suitable material.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. An active anti-theft device for protecting movable property comprising:
    a computer device;
    at least one stationary connector connecting to said computer device by a first connection, wherein said at least one stationary connector affixes to a stationary object;
    at least one portable connector connecting to said computer device by a second connection, wherein said at least one portable connector connects to at least one component of said movable property;
    at least one sensor connecting to said computer device by a third connection;
    a power source; and
    an alarm member,
    wherein said computer device sends a signal to each said at least one stationary connector, said at least one portable connector and said at least one sensor, wherein said alarm member is activated if said signal from said computer device going to said at least one stationary connector, said at least one portable connector or said at least one sensor does not return to said computer device as predetermined by a monitoring setup.

2. The active anti-theft device of claim 1, wherein said power source is a solar panel device or an electric outlet connecting to said computer device by cables or wires, wherein said power source connects to a battery of said movable property which then connects to said computer device or wherein said power source connects directly to said computer device.

3. The active anti-theft device of claim 1, wherein said at least one component of said movable property has an opening that said at least one portable connector can be inserted through and secured therein.

4. The active anti-theft device of claim 1, wherein said at least one sensor connects to at least one component of said movable property.

5. The active anti-theft device of claim 4, wherein said third connection comprises a first end of a first member connecting to said computer device, a second end of said first member connecting to said at least one sensor on said component of said movable property, a first end of a second member connecting to said computer device, a second end of said second member connecting to said sensor on said component of said movable property, wherein said third connection creates a loop for said signal from said computer device to be sent to said sensor and then return to said computer device, wherein said alarm member is activated if said signal does not return to said computer device as predetermined by said monitoring setup, thereby indicating that said third connection has been detached, cut or disturbed.

6. The active anti-theft device of claim 4, wherein said at least one component of said movable property is a door or a battery compartment door.

7. The active anti-theft device of claim 1, further comprising a key switch connecting to said computer device by a fourth connection, wherein said key switch activates and deactivates said anti-theft device.

8. The active anti-theft device of claim 7, wherein said fourth connection comprises a first end of a first member connecting to a battery of said movable property, a second end of said first member connecting to said key switch, a first end of a second member connecting to said key switch, a second end of said second member connecting to said computer device, a first end of a third member connecting to said computer device and a second end of said third member connecting to said battery of said movable property,
   wherein activation of said key switch provides power to said active anti-theft device,
   wherein said alarm member is activated if said signal does not return to said computer device as predetermined by said monitoring setup, thereby indicating that said fourth connection has been detached, cut or disturbed.

9. The active anti-theft device of claim 7, wherein said key switch operates by a remote control.

10. The active anti-theft device of claim 1, wherein each of said at least one stationary connector and said at least one portable connector comprises:
   a housing having a body, a first end and a second end;
   a wire inside of said housing;
   a first end cap on said first end of said housing; and
   a connection attachment member in or on said first end cap,
   wherein a first end of said wire connects to a first side of said connection attachment member, said wire extends through an inside of said body of said housing to said second end of said housing, wherein said wire secures to a catch member therein, said wire therein extends through said inside of said body of said housing to said first end of said housing and wherein said second end of said wire connects to said first side of said connection attachment member.

11. The active anti-theft device of claim 10, wherein a first end of a connection member attaches to said computer device and a second end of said connection member attaches to a second side of said connection attachment member thereby forming said first connection of said at least one stationary connector.

12. The active anti-theft device of claim 10, wherein a first end of a connection member attaches to said computer device and a second end of said connection member attaches to a second side of said connection attachment member thereby forming said second connection of said at least one portable connector.

13. The active anti-theft device of claim 10, wherein said at least one portable connector further comprises a second end cap on said second end of said housing, wherein said catch member is positioned on an inside of said second end cap.

14. The active anti-theft device of claim 13, wherein said first end cap and said second end cap of said at least one portable connector have a diameter or width greater than a diameter or width of said body of said housing.

15. The active anti-theft device of claim 10, wherein said connection attachment member is a telephone jack receiver.

16. The active anti-theft device of claim 1, wherein at least one of said first connection, said second connection and/or said third connection is a telephone cable.

17. The active anti-theft device of claim 1, wherein at least one of said first connection, said second connection and/or said third connection is a wireless connection means.

18. The active anti-theft device of claim 1, wherein said computer device connects to a battery of said movable property by a first cable means and wherein said battery connects to said power source by a second cable means.

19. The active anti-theft device of claim 1, wherein said movable property is a boat, an automobile, a motorcycle, a camper, a motor home, a plane, a trailer, a bicycle, or heavy machinery.

20. The active anti-theft device of claim 1, wherein said alarm member comprises a siren and/or a light.

* * * * *